United States Patent [19]

Garçonnat et al.

[11] Patent Number: 4,594,695
[45] Date of Patent: Jun. 10, 1986

[54] METHODS AND DEVICE FOR ATTENUATING SPURIOUS NOISE

[75] Inventors: Michel Garçonnat, Ris Orangis; Philippe Morgand, Athis Mons, both of France

[73] Assignee: Thomson-CSF, Paris, France

[21] Appl. No.: 530,824

[22] Filed: Sep. 9, 1983

[30] Foreign Application Priority Data

Sep. 9, 1982 [FR] France .................... 82 15279

[51] Int. Cl.[4] .............................................. H04B 1/06
[52] U.S. Cl. .................................... 367/135; 367/901; 381/71
[58] Field of Search .................. 367/135, 901; 381/71; 364/574

[56] References Cited

U.S. PATENT DOCUMENTS 4,232,381  11/1980  Rennick et al. ...................... 367/135

FOREIGN PATENT DOCUMENTS 0043565  1/1982  European Pat. Off. .

Primary Examiner—Richard A. Farley
Attorney, Agent, or Firm—Sughrue, Mion, Zinn, Macpeak and Seas

[57] ABSTRACT

A method and device for attenuating wideband spurious noises to improve the signal-to-noise ratio of a tracked acoustic signal. Two sensors (1 and 2) are provided, one of which receives the disturbed tracked signal and the other the spurious noises, to feed a plurality of correlation modules (4) via as many spectrum-line filters (3) distributed throughout the useful bandwidth of sensor (1), each of said correlation modules (4) supplying a correction signal and the sum of said correction signals being subtracted from the signal given by sensor (1) to yield a noise-free tracked signal. The invention is applicable to acoustic reception systems used in noisy environments.

3 Claims, 3 Drawing Figures

METHODS AND DEVICE FOR ATTENUATING SPURIOUS NOISE

FIELD OF THE INVENTION

This invention concerns a method and a device for attenuating wideband spurious noise and specifically a device to improve the signal-to-noise ratio obtained from a signal sensor disturbed by spurious noises.

BACKGROUND OF THE INVENTION

Attenuation of noises disturbing tracked signals is typically performed in the prior art by using self-adaptive transverse filters which are effective as long as there is only a single noise source and the noise is carried by a plane wave. The noise components are estimated with the help of a transverse filter and are subtracted from the signal supplied by the disturbed sensor. The tracked signal, as corrected by subtraction, is continually put to use in the filter to adjust the various filter coefficients so as to obtain an optimum attenuation. In practice, the tracked signals received by a sensor, such as a microphone or a hydrophone, are usually drowned in noises comprising spectrum lines originating from different sources and the noises are picked up after having travelled along a variety of unidentified acoustic paths.

In these conditions, the results obtained are thus far inferior to those obtained when the above-mentioned conditions are observed.

Other relevant prior art, described in U.S. Pat. No. 4,232,381, provides for attenuation of spurious noises from the engine of a vehicle equipped with an acoustic signal receiver. The device comprises a rotation sensor which generates pulses for use by a synchronous filter which selects the fundamental and harmonic frequencies of the engine noise for the purpose of generating a correcting signal enabling static removal from the signal received by the acoustic signal receiver.

It is the object of the present invention to provide a method and two devices for attenuating wideband noises disturbing a tracked acoustic signal, which are both simpler and more efficient than the above-mentioned devices.

SUMMARY OF THE INVENTION

The method according to the invention makes use of two sensors: a first, acoustic type sensor picking up the tracked acoustic signal and a second sensor designed to supply a noise signal alone. The signal from the second sensor is filtered, then subtracted from the signal from the first sensor as in the prior art.

According to one feature of the invention, the filtered signal obtained from the second sensor—the sensor which is insensitive to the tracked acoustic signal due to its location or its nature—is the sum of a plurality of correction signals each resulting from the correlation of the signal from the first sensor with a different spectrum-line energy density signal obtained by narrow, spectral-line filtering of the signal output from the second sensor, the number of correction signals being selected to equal the number of spectral lines in which disturbing noise components occur.

By application of the method defined above, the present application also proposes a device for attenuating wideband noises disturbing an acoustic signal received by a first, acoustic-type sensor, wherein said attenuation is obtained by subtracting from the signal sent by the first sensor a correction signal obtained from a second sensor designed to deliver a signal corresponding to the noise alone.

In one embodiment of the invention, said attenuation device comprises:

means of filtering the signal from the second sensor on a spectral line basis in order to supply an energy density signal for each spectral line where a disturbing noise component is present;

means of correlating each of the energy density signals supplied by the filtering means, following its dephasing, with the signal sent by the first sensor, in order to provide as many correction signals as there are energy density signals being simultaneously provided;

means of adding together the simultaneously obtained correction signals;

and means of subtracting from the signal sent by the first sensor the signal obtained from the adding means, in order to provide an electrical image of the noise-free acoustic intelligence signal.

In another embodiment of the invention, said attenuation device comprises:

means of converting into digital form the output signals from both sensors;

means for computing the fast Fourier transforms of the output signals from both sensors to yield a sum signal of the correlated corrections, said corrections being being equal in number to the number of spectral lines requiring attenuation, to subtract the sum signal from the product of the fast Fourier transform of the output signal from the first sensor and to derive an electrical image of the acoustic intelligence signal by inverse fast Fourier transforming the signal obtained by subtraction.

The features and advantages of the invention are described in greater detail below with reference to the figures listed below.

DESCRIPTION OF PREFERRED EMBODIMENTS

Figure 1:
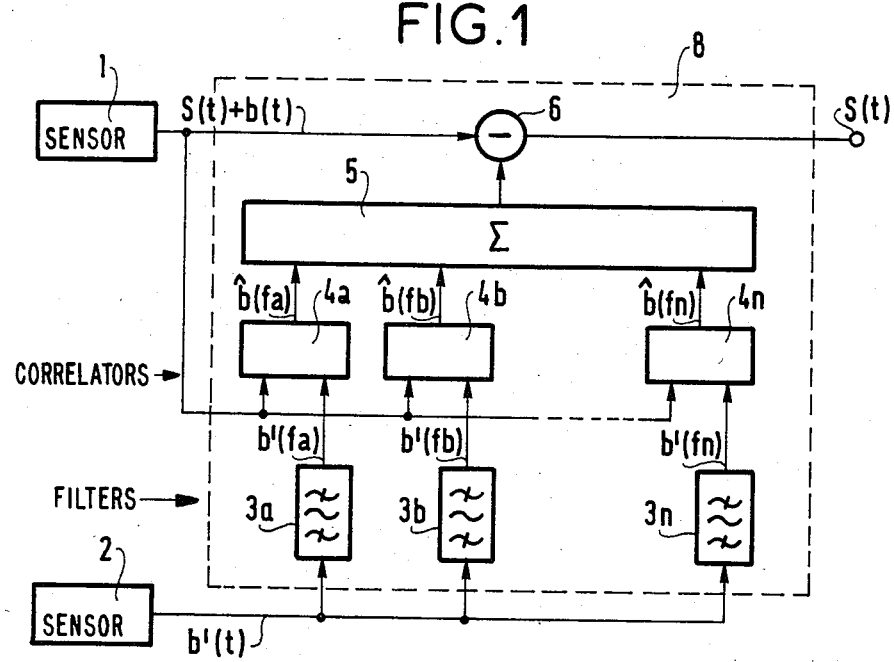
FIG. 1 is a block diagram of the attenuation device according to the invention.

The wideband spurious noise attenuation device according to the invention is essentially designed to improve the signal-to-noise ratio obtained for a signal supplied by an acoustic sensor 1, such as a microphone or a hydrophone, in the case where the intelligence or tracked signal picked up by said sensor is drowned in spurious noise.

It is indeed typically not practicable to remove the noise sources disturbing reception of an acoustic signal, as in the case, for example, of hydrophone use aboard a moving ship, especially when the signal to be picked up is of the same nature as the noise.

In fact, although the use of a directional and/or narrow field microphone or hydrophone makes it possible to favour one source in relation to other sources located outside the preferential field or out of range, there are many cases where the disturbance sources are nearer and more powerful than the wanted signal source and where the acoustic paths followed by the noise waves lead them into the sensor's preferential field.

It is generally possible however to find zones wherein spurious noises are present while the tracked signal can no longer be picked up, making it possible to dispose one or several sensors 2 therein to pick up these noises alone. Specifically, the noise sources may be so powerful as to make it possible to easily pick up the noise alone, or the type of sensor 2 can be selected such that it is not, as opposed to sensor 1, sensitive to the tracked signal.

For example, it is possible in order to eliminate the spurious noises interfering with hydrophonic listening aboard a ship, when said noises are due to the ship itself, such as in the case of sound waves generated by vibrations from the ship's machinery, to employ accelerometers mounted on the machines or on the hull as noise sensors 2, instead of hydrophones.

Clearly, the number of sensors 1 and 2 used to pick up tracked and noise signals may vary according to need. However, for purposes of simplifying the description, only one sensor 1 of disturbed tracked signals and one sensor 2 of spurious noise are shown in the drawings and taken into account herein.

In accordance with the invention, the noise signal b'(t) generated by the noise-only sensor 2 is used to correct the signal s(t)+b(t) generated by the signal sensor 1, said signal being amplified as required by conventional means.

The signal b'(t) from sensor 2, amplified as required, is applied to a plurality of narrow-band filters 3a to 3n, called spectrum-line filters, which are individually centered on different frequencies throughout the spectrum corresponding to the intelligence signal to be extracted.

Thus, in an embodiment of the invention where the useful bandwidth is 100 to 1000 Hz, sixteen spectrum-line filters 3, adjustable in 1 Hz steps, would be used.

Each spectrum-line filter 3 supplies a reference value b'(f) standing for the spectral energy density of the noise picked up by sensor 2 in the frequency under consideration, for example b'(fa) for the spectrum-line filter 3a centered on frequency fa. Each filter 3 is connected to one input of a dedicated correlation module 4a to 4n having a second input connected to the output of sensor 1 wherefrom it receives signal S(t)+b(t).

The correlation modules 4 may, for example, be of the type described in same applicant's French Pat. No. 2215 005, in which case each correlation module 4, such as 4a, comprises:

a conventional normalization circuit 48, normalizing the power of the signal supplied by the associated spectrum-line filter 3;

a phase shifter 40 connected to the output of normalization circuit 48 with which it is associated and from which it receives a signal b'(fa) and shifts the phase thereof by a value of $\pi/2$;

two input multipliers 41, 42, one of which 41 has its inputs connected respectively to sensor 1 and to the output of filter 3a, and the other of which has its inputs connected respectively to sensor 1 and to the output of phase shifter 40;

two integrators 43 and 44 respectively connected to the outputs of the input multipliers 41 and 42;

two output multipliers 45 and 46, one of which 45 has its inputs connected respectively to the outputs of integrator 43 and of filter 3a and the other of which 46 has its inputs connected respectively to the outputs of sensor 1 and of phase shifter 40;

an adder 47 whose inputs are connected to the outputs of output multipliers 45 and 46 such as to supply a signal b̂(fa) corresponding to the correction to be applied to signal S(t)+b(t) in order to remove the noise component of the frequency fa covered by filter 3a.

Unit 8 making up the attenuation device according to the invention and therefore containing the filters 3 and the correlation modules 4 further comprises an adder 5, input-connected to the outputs of the correlation modules 4, adding up the correction signals b̂(fa), b̂(fb), ...b̂(fn) supplied by said modules into a correction signal synthesizing the spurious noises affecting the tracked signal.

A subtractor circuit 6, fed by both sensor 1 and adder 5, subtracts the correction signal from the signal S(t)+b(t) sent by sensor 1 and provides an electrical signal equivalent of the noise-filtered tracked signal.

Clearly, in practice, the number of spectrum-line filters 3 will necessarily be limited if the signals are not converted into digital form and it is the adjustability of the filters which enables specific spectral lines to be selected for correction, since the spurious noise is typically not a white noise and only the energy of certain specific spectral lines needs to be taken into account, the noise component of the other lines being either negligible or null.

An attenuation device applying the method according to the invention can be implemented to advantage, after conversion from analog to digital form of the signals delivered by the sensors, using Fourier transforms or more specifically, fast Fourier transforms (FFT).

In this way it is possible to obtain the equivalent of a large number of spectrum-line filters distributed throughout the useful bandwidth, the equivalent for example of one thousand spectrum-line filters, using a thousand-point transform, which in the digital example suggested above enables the correction of all the whole frequencies of the useful band.

Figure 2:
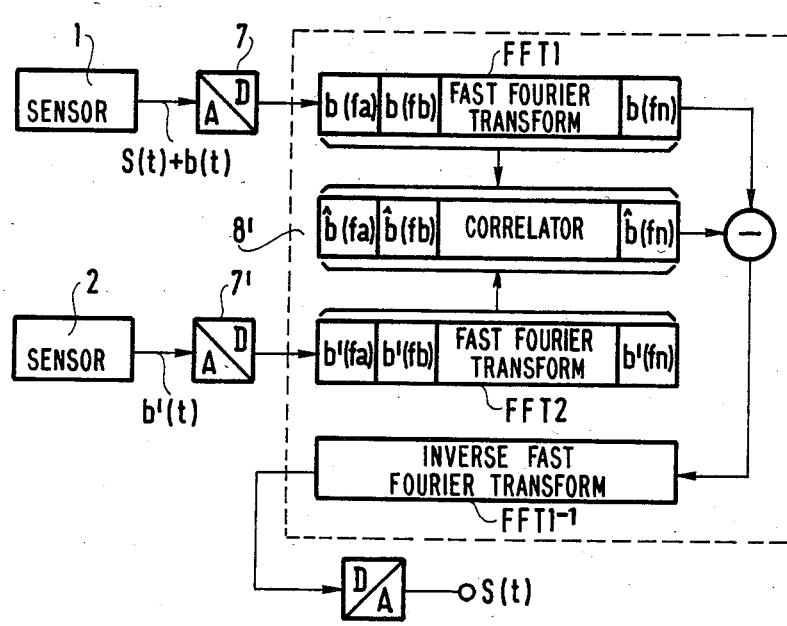
FIG. 2 is a block diagram of the attenuation device according to the invention, in digital form.
Figure 3:
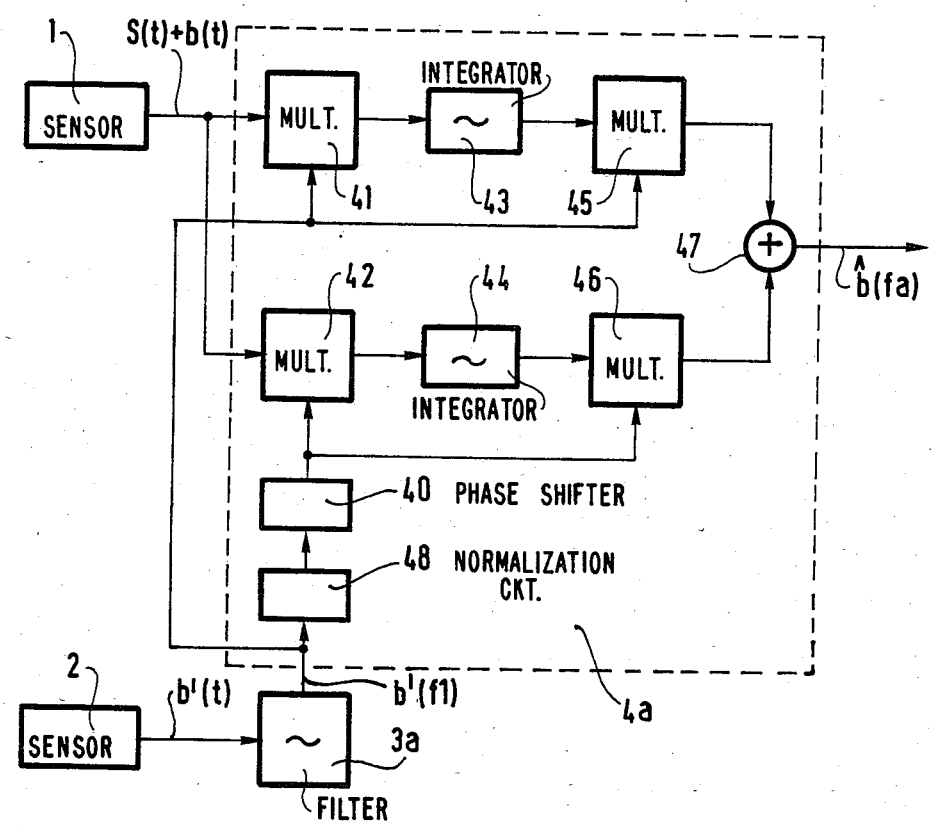
FIG. 3 is a diagram of a correlation module for the device according to the invention.

As shown in FIG. 2, each sensor 1 and 2 is linked to a suitable analog-to-digital converter 7 and each converter feeds the results of its conversions to a unit 8' consisting of a computer capable of computing a double fast Fourier transform (FFT1, FFT2) based upon the signals received from each of the converters to yield an $\epsilon 0$ sum signal of the correlated corrections carried out for each spectral line or transform point.

An inverse transform $FFT^{-1}$ of the yield of the subtraction, i.e. transform FFT1 minus $\epsilon$ sum, then enables the tracked signal to be reconstituted in digital form and, if need be, to be converted back to analog form via a digital-to-analog converter.

Clearly, the processing possibilities afforded by the use of fast Fourier transforms also enable a variety of sensors 1 and 2 to be more easily combined as the need arises.

We claim:

1. A device for attenuating wideband noises disturbing a tracked acoustic signal in a system including a first, acoustic-type sensor for receiving said acoustic signal and providing an output signal, and a second sensor for supplying an output signal corresponding to the noise alone, said device comprising:

filtering means for filtering on a spectrum-line basis the output signal of said second sensor so as to provide an energy density signal for each spectral line where a spurious noise component is present;

correlating means for phase shifting the energy density signals and for correlating each phase shifted energy density signal with the output signal of said first sensor in order to simultaneously obtain as many correction signals as there are energy density signals being simultaneously supplied;

adding means for adding the simultaneously obtained correction signals to provide an adder output signal; and subtracting means for subtracting, from the output signal of the first sensor, the output signal of the adding means in order to provide an electrical image of the tracked acoustic signal.

2. A device for attenuating wideband noises disturbing an acoustic signal in a system including a first, acoustic-type sensor for receiving said acoustic signal and providing an output signal and a second sensor for providing an output signal corresponding to the noise alone, said device comprising: converting means for converting into digital form the output signals from both sensors and processing means for processing the converted output signals to obtain an electrical signal representing the useful acoustic signal, said processing means including:

FFT processing means for fast Fourier transforming the output signals from both sensors to yield a sum signal corresponding to the sum of correlation signals which would be obtained by correlating the output of said first sensor with correction signals derived from the output of said second sensor and corresponding in number to the number of spectral lines where an attenuation is required, subtracting means for subtracting said sum signal from the fast Fourier transform of the first sensor's output signal to provide a subtractor output, and inverse FFT processing means for inverse fast Fourier transforming said subtractor output to obtain said electrical image of the useful acoustic signal.

3. A method of attenuating wideband noises disturbing a signal from a first, acoustic-type sensor receiving a tracked acoustic signal, said method comprising the steps of:

providing a second sensor signal from a second sensor which is insensitive to the tracked acoustic signal;

spectral line filtering said second sensor signal to obtain a plurality of different spectral-line energy density signals;

correlating said signal from said first sensor with said plurality of different spectral-line energy density signals to obtain a plurality of correction signals equal in number to the number of spectral lines in which a noise component is present;

summing said correction signals to obtain a processed signal; and subtracting said processed signal from said signal from said first sensor to attenuate wideband noises in said signal from said first sensor.

* * * * *